United States Patent

Yamamoto et al.

[11] Patent Number: 5,088,656
[45] Date of Patent: Feb. 18, 1992

[54] TAPE CARTRIDGE USING METAL AND PLASTIC RESIN

[75] Inventors: Osamu Yamamoto, Takatsuki; Akihiko Sato, Nagaokakyo; Hitoshi Shiba, Kyoto, all of Japan

[73] Assignee: Hitachi Maxell, Ltd., Osaka, Japan

[21] Appl. No.: 713,005

[22] Filed: Jun. 10, 1991

Related U.S. Application Data

[63] Continuation of Ser. No. 411,892, Sep. 25, 1989, abandoned.

[30] Foreign Application Priority Data

| Sep. 26, 1988 | [JP] | Japan | 63-240537 |
| Dec. 19, 1988 | [JP] | Japan | 63-164798[U] |
| Dec. 19, 1988 | [JP] | Japan | 63-321624 |
| Dec. 19, 1988 | [JP] | Japan | 63-321625 |

[51] Int. Cl.[5] .................................. G11B 23/87
[52] U.S. Cl. .................................................. 242/199
[58] Field of Search ........................ 242/197-200; 360/132

[56] References Cited

U.S. PATENT DOCUMENTS

| 4,267,986 | 5/1981 | Uemura et al. | 242/199 |
| 4,330,068 | 5/1982 | Shoji | 242/199 X |
| 4,387,823 | 6/1983 | Shiba | 242/199 X |
| 4,754,938 | 7/1988 | Satoh | 242/199 |
| 4,791,484 | 12/1988 | Sasaki | 360/132 |

*Primary Examiner*—Daniel P. Stodola
*Assistant Examiner*—William G. Battista, Jr.
*Attorney, Agent, or Firm*—Birch, Stewart, Kolasch & Birch

[57] ABSTRACT

There is provided a tape cartridge comprising a top plate and bottom plate made of metal and an intermediate frame made of plastic resin material disposed between the top and bottom plates.

6 Claims, 6 Drawing Sheets

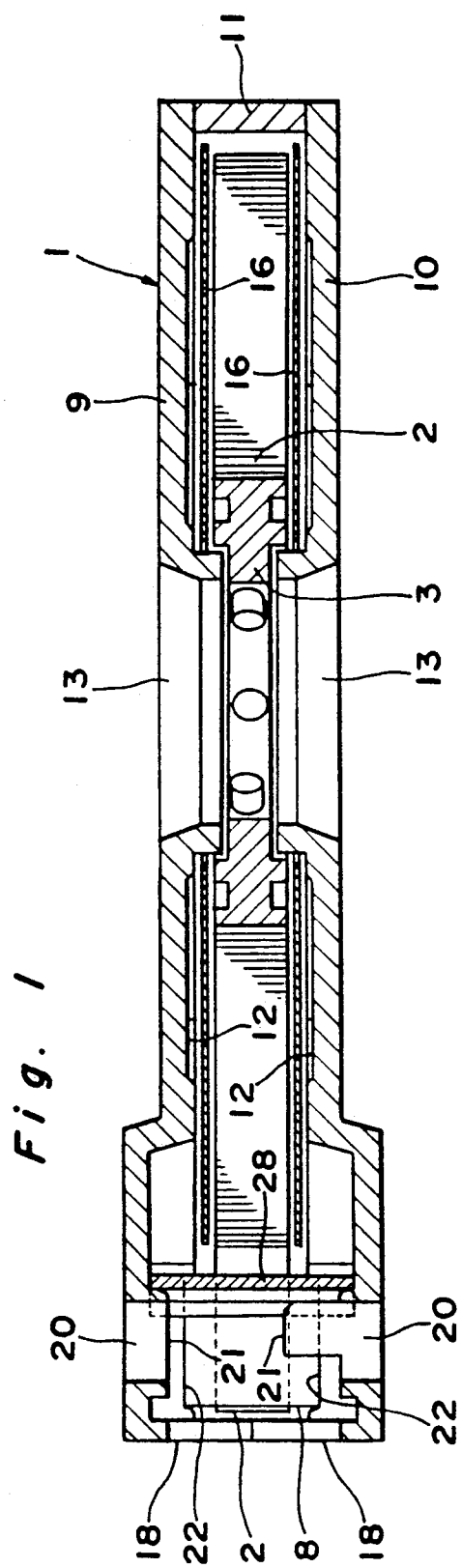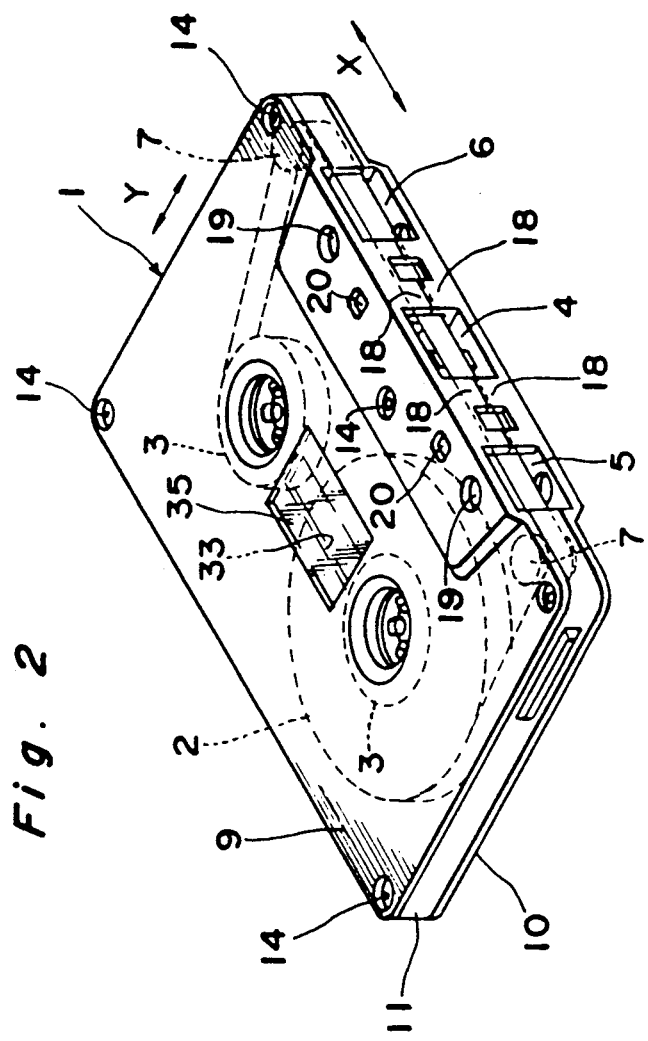

TAPE CARTRIDGE USING METAL AND PLASTIC RESIN

This application is a continuation, of application Ser. No. 07/411,892, filed on Sept. 25, 1989, now abandoned.

BACKGROUND OF THE INVENTION

1. Field of the Invention

The present invention relates to a tape cartridge and more particularly to a tape cartridge having a case body which is capable of improving the tape running property.

2. Description of the Prior Art

In general, the case body of a tape cartridge used for recording various electric signals, such as analog signals or digital signals is formed by assembling a top case half and a bottom case half made of plastic resin material. In the tape cartridges in which the entire case body is made of plastic resin material, it is difficult to substantially improve the assembling accuracy due to distortion at the time of molding. Therefore, there have been proposed tape cartridges having a case body that is made of a top plate and a bottom plate conforming to the standard and an intermediate frame disposed between the top and bottom plates providing either a tape chamber and tape running path, wherein the top and bottom plates are made of plastic resin material and the intermediate frame is made of metal so as to improve the accuracy of assembling (Japanese utility publication (unexamined) 57-13668).

In order to improve the tape running property in addition to improve the assembling accuracy, there have been proposed tape cartridges wherein a cover half and a base half acting as a tape running mechanism are made of plastic resin material and a cover frame and a base frame to which the cover half and base half are respectively mated are made of metal (Japanese patent publication (unexamined) 59-33679).

In tape cartridges, there occurs irregular contact of the recording tape and the recording head at the time of recording or reproducing and there further occurs modulation noise due to external vibration by the vibration of the tape deck. In order to improve the sound quality at the time of recording and reproduction of the recording tape, it is important to suppress the modulation noise. Particularly it is important not only to absorb the external vibration, which is a cause of the modulation noise, but to make the tape cartridge so as to prevent the effect of the external vibration.

In general, in order to prevent the effect of external vibration, it is desired to increase the mass of the tape cartridge with the high rigidity avoiding resonance.

In the proposed tape cartridge of the former type in which the top and bottom plates are formed of plastic with the intermediate frame made of metal, although the mass and rigidity of the tape cartridge can be enhanced, since the top and bottom plates are made of plastic resin material, the rigidity of both plates, particularly in the central portion of the plates, is not sufficiently high, and the tape cartridge of this type is easily affected by external vibration. The same drawback is present in the latter case since the cover half and base half are made of plastic resin material.

SUMMARY OF THE INVENTION

An essential object of the present invention is to provide a tape cartridge in which the mass and the rigidity of the case body can be increased so that undesired vibration is suppressed and the effect of external vibration decreased.

A further object of the present invention is to provide a tape cartridge which is capable of improving the tape running property and the sound quality.

According to the present invention, there is provided a tape cartridge comprising a top plate and bottom plate made of metal and an intermediate frame made of plastic resin material disposed between the top and bottom plates.

BRIEF EXPLANATION OF THE DRAWINGS

The drawings are related to an embodiment of a tape cartridge according to the present invention wherein FIG. 1 is a cross sectional view taken along the lines A—A in FIG. 3, FIG. 2 is a perspective view showing an embodiment of the tape cartridge shown in FIG. 1.

DETAILED DESCRIPTION OF THE PREFERRED EMBODIMENTS

Before the description proceeds, it is noted that the direction shown by the arrow mark X, that is the left and right directions with respect to the case body shown in FIG. 2, is defined as the lateral direction and the direction shown by arrow mark Y is defined as a longitudinal direction.

Referring to FIG. 1, according to the present invention, a tape cartridge is composed of a top plate 9 and a bottom plate 10 opposed to the top plate 9, respectively made of a flat metal plate, and a intermediate frame 11 made of plastic resin material disposed between the top plate 9 and bottom plate 10 so as to surround the left and right sides and front and back sides and provide a tape accommodating chamber. A tape guide block 8 made of plastic resin material is disposed in the front portion of the tape accommodating chamber.

By forming the top plate 9 and the bottom plate 10 of metallic material, the mass of the tape cartridge and the stiffness of the tape cartridge can be advantageously increased, so that it is possible to suppress the transmission of vibrations.

By forming the intermediate frame 11 of a plastic resin material, when the tape cartridge is subjected to bending vibration in a tape player or the like, since the intermediate frame exhibits some flexibility due to the elasticity of the plastic resin material, it is possible to suppress the bad effect of the vibration.

Furthermore, since the tape guide block 8 is not formed of metal, but is formed of a plastic resin material, the tape advancing is not deteriorated.

A preferred embodiment of the tape cartridge according to the present invention will be described in detail with reference to FIG. 1 to FIG. 6.

Figure 3:
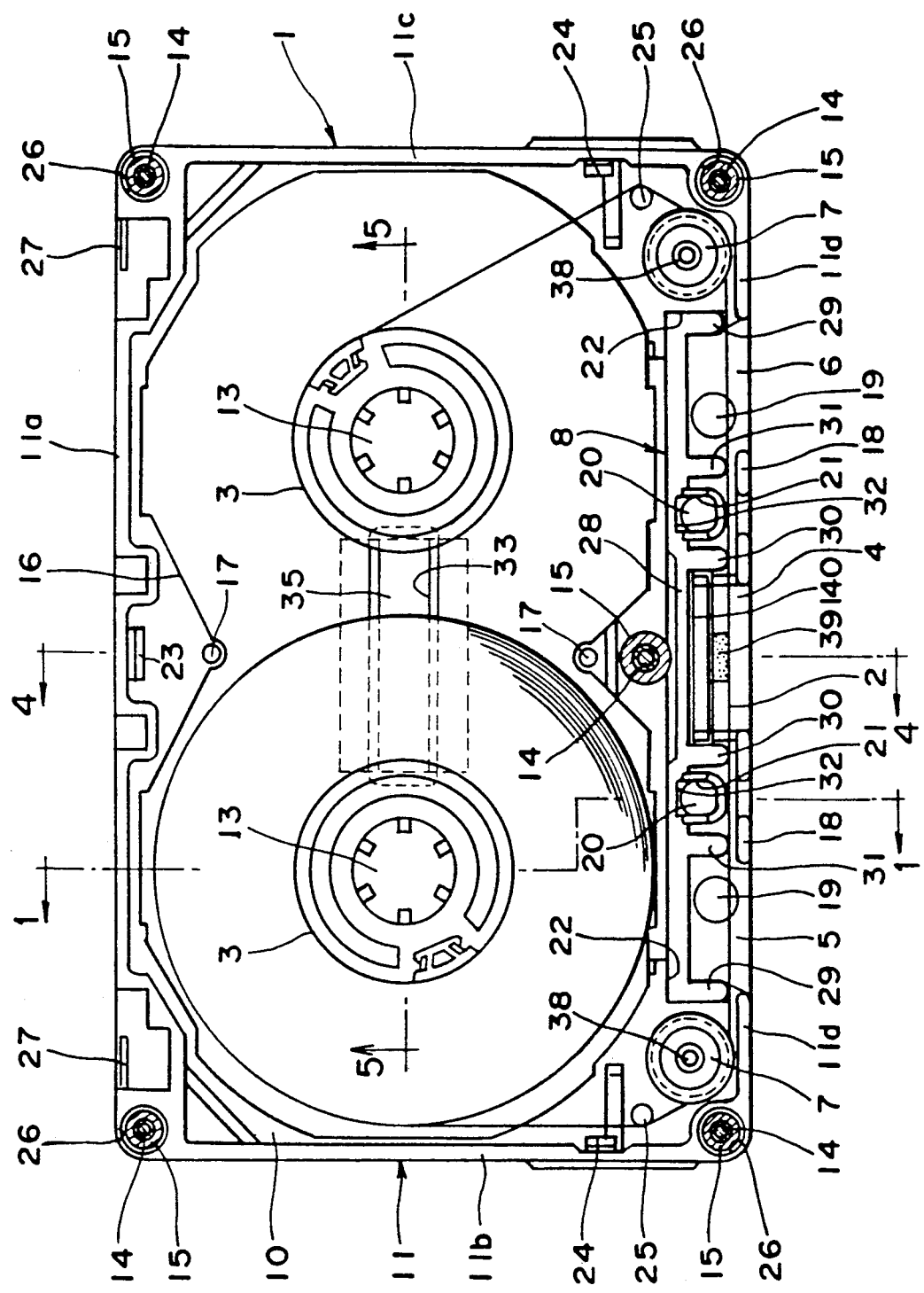
FIG. 3 is a plan view showing the inside of the tape cartridge shown in FIG. 2.

Referring to FIGS. 2 and 3, a case body 1 accommodates a pair of hubs 3 disposed at a left portion and right portion of the case body 1 for winding a recording tape 2. There are provided a recording head insertion window 4 at the center portion of the case body 1 with respect to the left and right direction, a erasing head insertion window 5 and a pinch roller insertion window 6, the latter two windows on both sides of the recording head insertion window 4, at the front wall of the case body 1. A pair of tape guide rollers 7 are disposed on the left and right corners in the front portion of the case body 1 and the tape guide block 8 is disposed between the guide rollers 7.

The recording tape 2 can be drawn out from one of the hubs 3 and taken up by the other hub 3 being guided by the tape guide rollers 7 and the tape guide block 8.

The case body 1 is formed by the top plate 9 and the bottom plate 10 made of metal and the intermediate frame 11 made of plastic resin material, as mentioned above.

Figure 6:
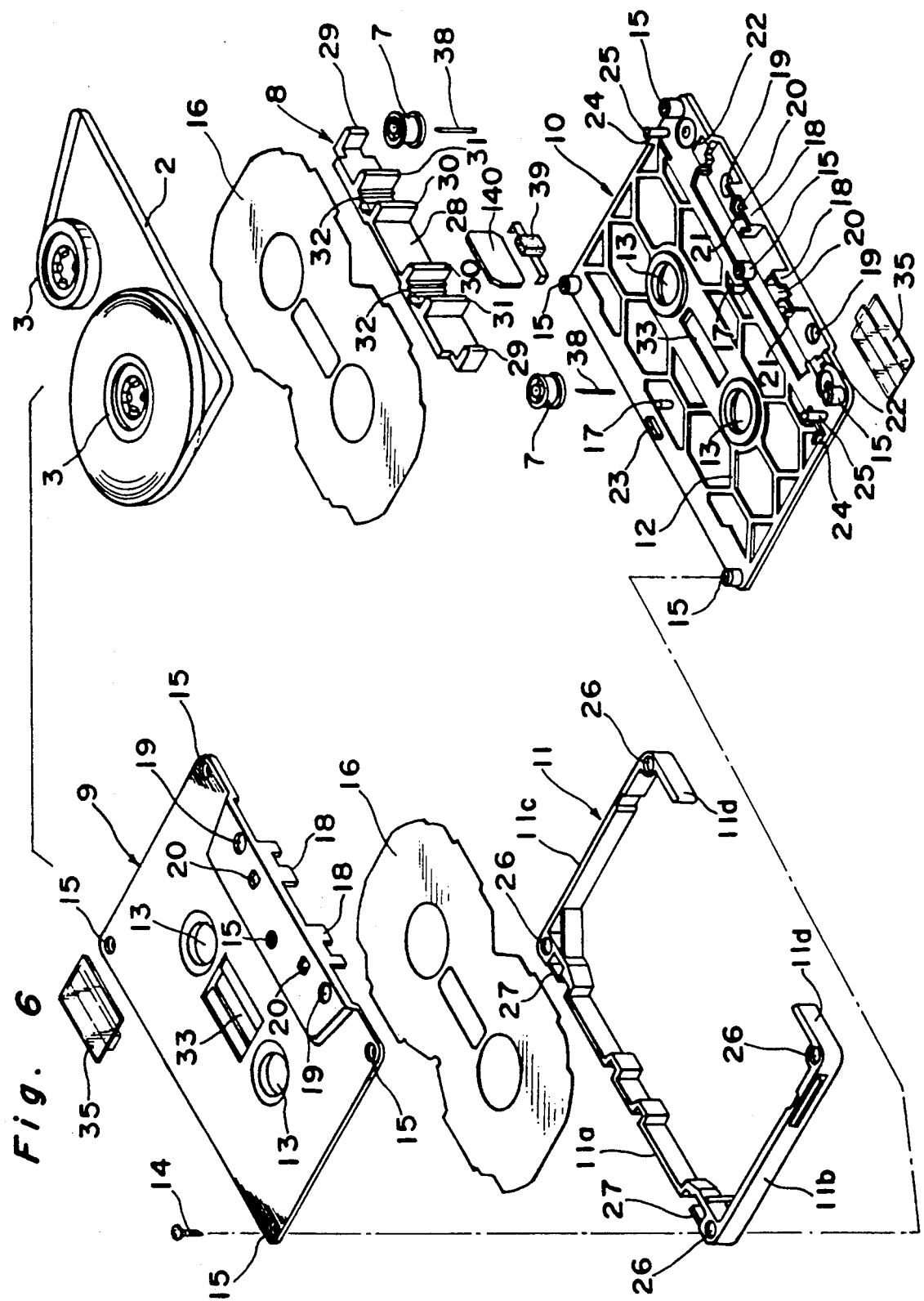
FIG. 6 is a exploded view showing the tape cartridge shown in FIG. 3.

In FIG. 6, the top plate 9 and the bottom plate 10 are made of metal, such as aluminum alloy die casting flat plates, with the inner surfaces of the top plate 9 and bottom plate 10 formed of ribs 12 of honeycomb shape for preventing undesired resonance. The top plate 9 and the bottom plate 10 are respectively provided with a pair of driving shaft insertion holes 13 on both sides of the central portion and, in addition, connection bosses 15 are provided to which connection screws 14 are threaded at the four corners, and the central portion of the front portion of the top and bottom plates 9 and 10. In addition, there are projected a pair of sheet regulating pins 17 at both the front and back portions on the center of the top and bottom plates 9 and 10 for positioning a liner sheet 16. At the front portion of each of the top plate 9 and bottom plate 10 there is provided a pair of front walls 18 for defining the recording head insertion window 4, erasing head insertion window 5 and the pinch roller insertion window 6, a pair of capstan insertion holes 19 facing to the erasing head insertion hole 5 and the pinch roller insertion hole 6, and a pair of standard positioning holes 20. At the peripheral portions of each standard positioning hole 20 of each of the top and bottom plates 9 and 10, a pair of opposing plate like block regulating walls 21 are provided for regulating the position of the tape guide block 8. On the inner surfaces of the top plate 9 and bottom plate 10 block regulating recesses 22 are shaped at positions back from the block regulating walls 21 and outward in the lateral directions for further regulating the position of the tape guide block 8.

In the bottom plate 10, a rib 23 for preventing deformation of the intermediate frame, is projected at the central and back edge portion. Also, in the bottom plate 10, jam preventing ribs 24 and tape guide pins 25 are projected at both lateral side edges of the front portion.

Referring to FIG. 6 again, the intermediate frame 11 is made of a composite plastic resin, preferably high elastic plastic resin material, in which the plastic base is made of polyolefin resin mixed with calcium carbonate of 45 to 65% by weight and is formed generally in a C character shape in plan view. The intermediate frame 11 comprises a back frame 11a for closing the back portion of the top plate 9 and the bottom plate 10, and lateral side frames 11b and 11c for closing the lateral sides of the top plate 9 and the bottom plate 10. The lateral side frames 11b and 11c have their front corner portions 11d for closing the lateral side corner portions of the top plate 9 and the bottom plate 10 and forming the erasing head insertion window 5 and the pinch roller insertion window 6 in association with the front walls 18. The intermediate frame 11 has connection holes 26 at its four corners for mating with the connection bosses 15 of the top plate 9 and the bottom plate 10. The intermediate frame 11 has its back frame 11a formed integrally with a pair of erasure preventing tips 27 which facilitate breaking of the tips 27.

The tape guide block 8 is made of a plastic resin material such as AS resin or ABS resin, comprising a substrate 28 of a strip shape, a pair of vertical guide ribs 29 projected frontward symmetrically at the lateral ends of the front face of the substrate, a pair of central vertical guide ribs 30 projected frontward from the central portion of the front face of the substrate 28 symmetrically with respect to the lateral direction and a pair of vertical intermediate guide ribs 31 projected frontward symmetrically from the positions between the guide ribs 29 and the central guide ribs 30. A pair of vertical recesses 32 are shaped symmetrically between the intermediate guide rib 31 and the central guide rib 30 in the substrate 28 for avoiding interference with the standard positioning holes 20. When assembling the respective components the connection bosses of the bottom plate 10 are mated with the connection holes 26 of the intermediate frame 11, whereby the intermediate frame 11 can be assembled with the bottom plate 10, with the back surface and the lateral surfaces of the intermediate frame 11 aligned with the back edge and the lateral side edges of the bottom plate 10. In this case, the jam preventing ribs 24 and the frame deformation preventing rib 23 act effectively to position them. As seen in FIGS. 1 and 3, the lower edges of the guide ribs 29 are mated in the block regulating recesses 22 of the bottom plate 10 with the block regulating walls 21 mated in the recesses 32 of the guide block 8, whereby the tape guide block 8 can be positioned and maintained on the bottom plate 10. As shown in FIG. 3, the tape guide rollers 7 are rotatably mounted on the shafts 38 at the positions of the side portions of the tape guide block 8 maintained on the bottom plate 10. The lower liner sheet 16 is laid on the upper surface of the bottom plate 10 with the sheet 16 positioned by the sheet regulating pins 17 and the hubs 3 are mounted on the driving shaft insertion windows 13. It is noted that inside of the recording head insertion window 4, a pad 39 and a magnetic shielding plate 140 are installed. Furthermore, the recording tape 2 wound on one of the hubs 3 is passed through the tape running path between the tape guide block 8 and front wall 18 over the tape guide pins 25 and tape guide rollers 7.

Figure 4:
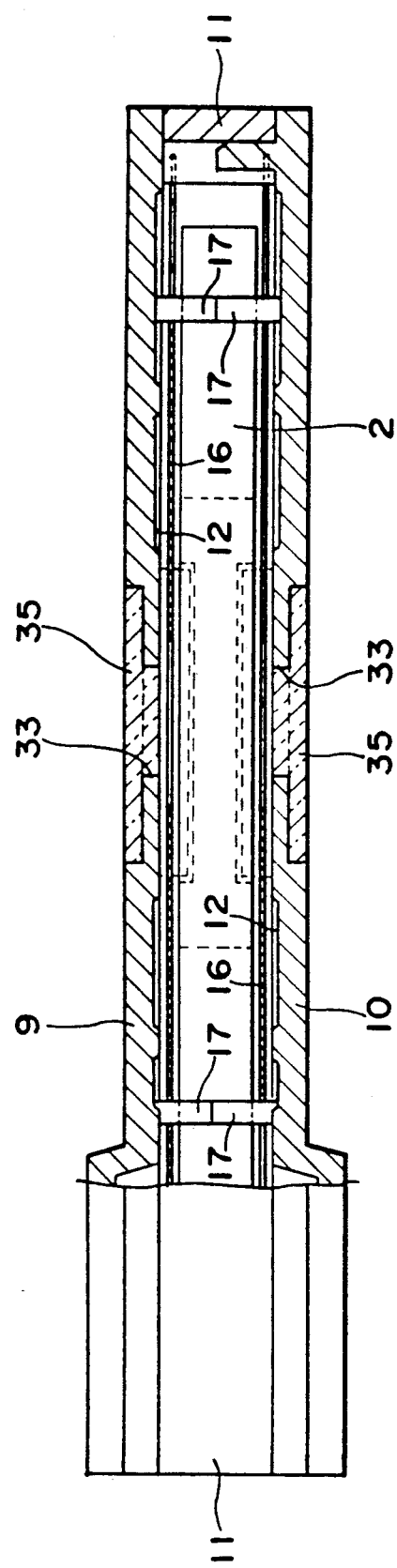
FIG. 4 is a cross sectional view taken along the lines D—D in FIG. 3.

Subsequently, as shown in FIGS. 1 and 4, the connection bosses 15 of the top plate 9 are mated in the connection holes 26 of the intermediate frame 11 and the front central screw connecting boss 15 of the bottom plate 10 is mated with the front central connecting boss 15, whereby the top plate 9 is covered on the intermediate frame 11 with the upper liner sheet 16 in between.

Finally, connecting screws 14 are screwed through the connection bosses of the top plate 9 whereby the top plate 9, intermediate frame 11 and the bottom plate 10 are integrally connected, with the tape guide block 8 secured between the top and bottom plates 9 and 10.

Figure 5:
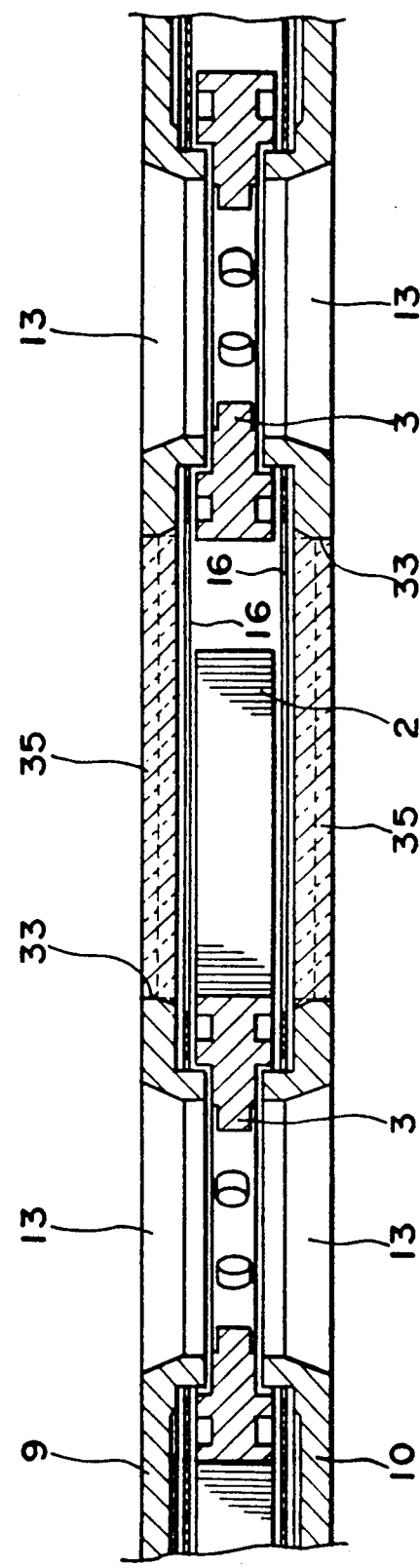
FIG. 5 is a cross sectional view taken along the lines C—C in FIG. 3.

As shown in FIGS. 4 and 5, a transparent window plate 35 made of a plastic resin material is installed in each of the windows 33 of the top and bottom plates 9 and 10.

A further embodiment of the present invention is explained with reference to FIGS. 7 to 10.

Figure 7:
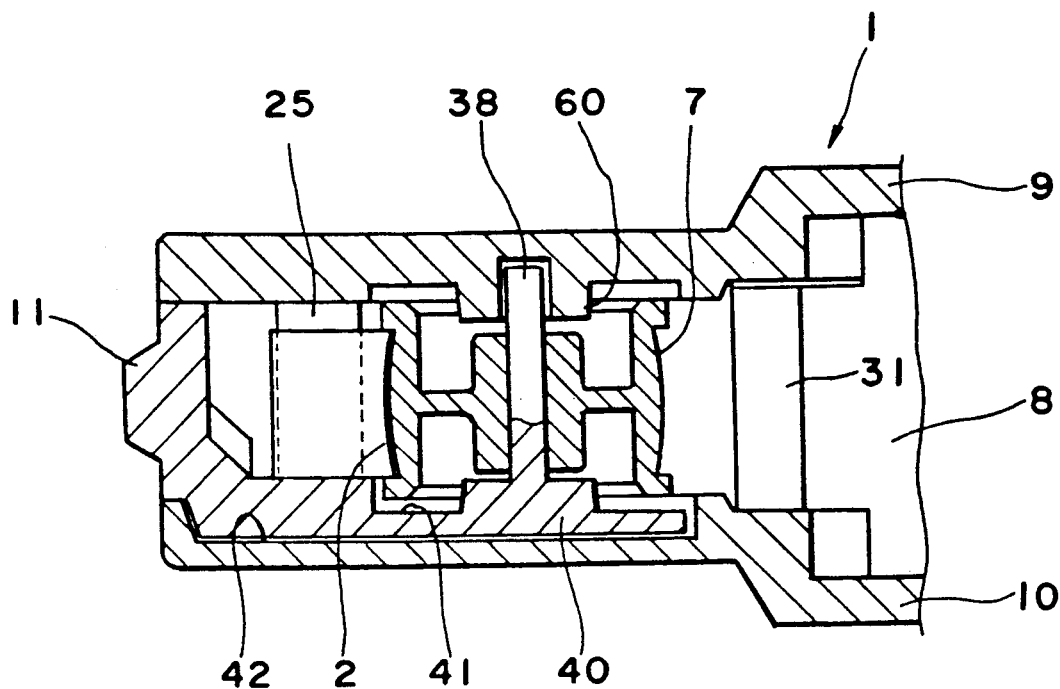
FIG. 7 is a cross sectional view showing an essential portion of a tape cartridge of a further embodiment of the present invention.
Figure 8:
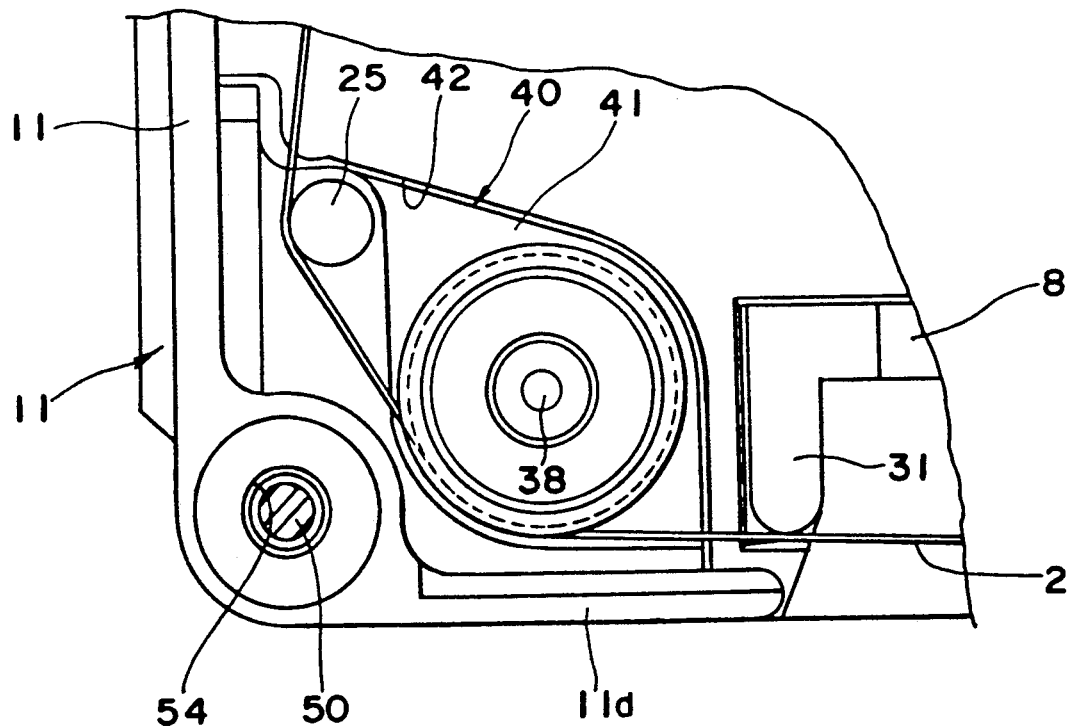
FIG. 8 is a plan view showing an essential portion of the further embodiment.
Figure 9:
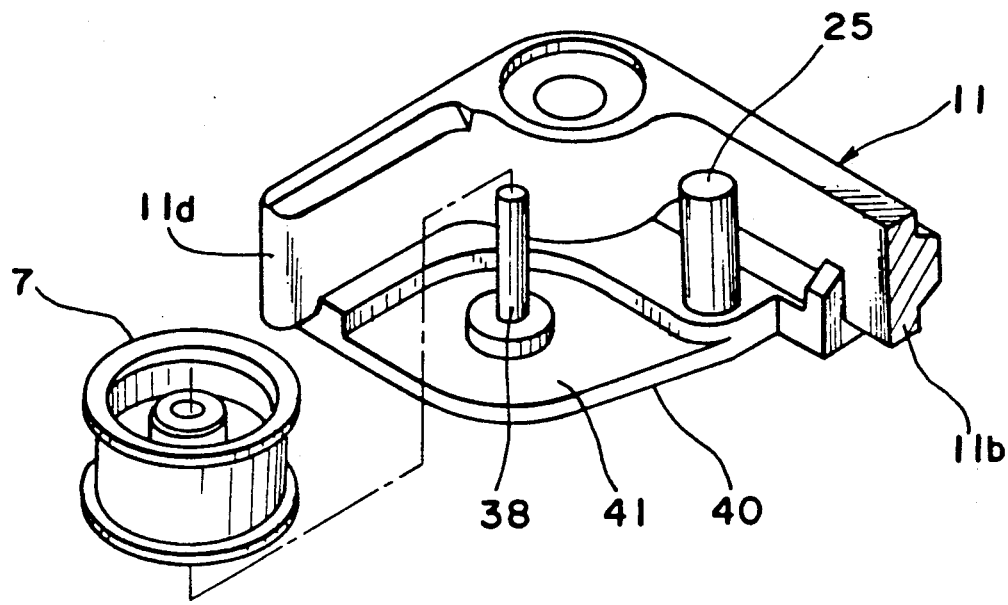
FIG. 9 is a exploded view of the essential portion of a further embodiment.

Referring to FIGS. 7 to 9, in the crossed corner of the front frame 11d and side frame 11b, an auxiliary bottom wall 40 is projected in a horizontal direction from the lower end of the inner surface of the intermediate frame 11 and a roller support shaft 38 and a tape guide pin 25 are vertically projected from the upper surface of the auxiliary bottom wall 40. The roller support shaft 38 and the tape guide pin 25 are formed simultaneously at the time of molding of the intermediate frame 11. In this arrangement, a separate tape guide roller 7 can be rotatably mounted on the roller support shaft 38 from above.

On the top surface of the auxiliary bottom wall 40 there is formed a recess portion 41 in a step down manner for avoiding interference with the tape guide roller 7. In addition, a mating recess 42 to which the auxiliary bottom wall 40 is mated is formed on the bottom plate 10. In the assembled state, as shown in FIG. 7, the top end portion of the roller support shaft 38 can be held by a boss 60 provided on the inner face of the top plate 9.

The auxiliary bottom wall 40 can act as a reinforcing member for the intermediate frame 11, particularly for preventing the deformation of the front frame 11d and the side frame 11b, improving the mechanical strength and rigidness of the intermediate frame 11.

Figure 10:
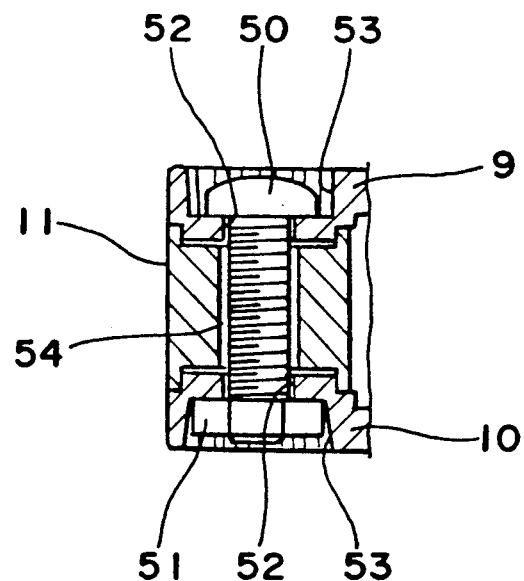
FIG. 10 is a cross sectional view showing in detail the screw connection region used in a further embodiment of the present invention.

Referring to FIG. 10, the top and bottom plates 9 and 10 and the intermediate frame 11 are connected by screws 50 and nuts 51. For this purpose, the four corners of the case body 1 are designated as the connecting regions in which there are formed screw holes 52 of through holes and connection seats 53 symmetrical with respect to the top and bottom of the intermediate frame and through holes 54 are penetrated in the intermediate frame 11 corresponding to the screw holes 52. At the front central screw connection portion of the case body 1, there are projected connection bosses 15 on the top and bottom plates 9 and 10 in an opposing manner, with the screw holes formed therethrough. In addition, the connection seats are formed similar to the seats formed at the four corners.

According to the present invention, since the top plate 9 and the bottom plate 10 are formed of metal, it is possible to increase the mass of the case body 1 and to improve the rigidity of the case body, including the central part of the top and bottom plates of the cartridge. In addition, since the intermediate frame disposed between the top plate and bottom plate is made of a plastic resin material, even if some vibration is transmitted to the cartridge, the vibration can be well absorbed and suppressed by the intermediate frame 11.

Therefore, according to the tape cartridge of the present invention, it is possible to provide a tape cartridge with good sound quality which is seldom affected by external vibration and wherein it is possible to decrease modulation noise. In addition, since it is possible to provide the tape guide blocks which are made separately of plastic resin material, the tape running property can be much improved with high accuracy in the mechanical dimensions.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tape cartridge comprising a top plate and a bottom plate both made of metal so as to provide weight and rigidity to said cartridge, and an intermediate frame made of a high elastic plastic resin material disposed between said top and bottom plates joining lateral and back sides of said top plate and bottom plate to provide flexibility to said cartridge so as to absorb and thereby suppress vibrations, said top plate, bottom plate and intermediate frame defining a tape chamber, and a tape guide block made of plastic resin material disposed at a front portion of said cartridge in said tape chamber.

2. The tape cartridge according to claim 1, said top plate and bottom plate are formed of an aluminum alloy.

3. The tape cartridge according to claim 2, wherein ribs in a honey comb shape are formed on an inner surface of said top and bottom plates.

4. The tape cartridge according to claim 1, wherein said high elastic plastic resin material comprises a composite plastic resin of a polyolefin resin having an inorganic filler mixed therein such that vibration is suppressed as a result of shearing deformation due to the elasticity and viscosity of said intermediate frame.

5. The tape cartridge according to claim 4, wherein said inorganic filler is calcium carbonate.

6. The tape cartridge according to claim 5, wherein said calcium carbonate is present in an amount of from 45 to 65% by weight of said composite resin.

* * * * *